United States Patent
Sallam

(10) Patent No.: US 7,647,308 B2
(45) Date of Patent: Jan. 12, 2010

(54) METHOD AND SYSTEM FOR THE DETECTION OF FILE SYSTEM FILTER DRIVER BASED ROOTKITS

(75) Inventor: Ahmed Sallam, Sunnyvale, CA (US)

(73) Assignee: McAfee, Inc., Santa Clara, CA (US)

( * ) Notice: Subject to any disclaimer, the term of this patent is extended or adjusted under 35 U.S.C. 154(b) by 223 days.

(21) Appl. No.: 11/594,096

(22) Filed: Nov. 8, 2006

(65) Prior Publication Data
US 2008/0109906 A1    May 8, 2008

(51) Int. Cl.
*G06F 17/30* (2006.01)
(52) U.S. Cl. .......................... 707/3; 707/101; 707/203; 726/23
(58) Field of Classification Search ................. 707/3, 707/203, 101; 714/38; 726/22–24
See application file for complete search history.

(56) References Cited

U.S. PATENT DOCUMENTS

| | | | | |
|---|---|---|---|---|
| 5,931,935 | A * | 8/1999 | Cabrera et al. | 710/260 |
| 7,152,242 | B2 * | 12/2006 | Douglas | 726/23 |
| 2005/0193173 | A1 * | 9/2005 | Ring et al. | 711/118 |
| 2005/0229250 | A1 * | 10/2005 | Ring et al. | 726/23 |
| 2007/0022287 | A1 * | 1/2007 | Beck et al. | 713/164 |
| 2007/0055711 | A1 * | 3/2007 | Polyakov et al. | 707/203 |
| 2007/0067844 | A1 * | 3/2007 | Williamson et al. | 726/24 |
| 2007/0079178 | A1 * | 4/2007 | Gassoway | 714/38 |
| 2007/0180529 | A1 * | 8/2007 | Costea et al. | 726/24 |
| 2007/0271610 | A1 * | 11/2007 | Grobman | 726/22 |
| 2008/0016571 | A1 * | 1/2008 | Chang | 726/24 |

OTHER PUBLICATIONS

1.Todd et al. "analysis of tools for detecting rootkits and hidden processes", 2007, JFIP International Federation for Information Processing, vol. 242, 17pages.*
2. Levine et al. "a methodology to detect and characterize Kernel level rootkit exploits involving redirection of the system call table", IEEE international Information 2004, 19 pages.*

* cited by examiner

*Primary Examiner*—Don Wong
*Assistant Examiner*—Hanh B Thai
(74) *Attorney, Agent, or Firm*—Zilka-Kotab, PC

(57) ABSTRACT

A method, system, and computer program product for detecting hidden files and folders that may be installed by or as part of a rootkit provides the capability to identify the method that is used to hide the files and folders, will continue working even if the operating system is modified, and is suitable for real-time detection of hidden files and folders. A method for detecting a rootkit comprises the steps of generating a plurality of query input/output request packets, each query input/output request packet requesting information relating to a file system directory folder, transmitting a generated query input/output request packet to each file system driver object, receiving a result including the requested information relating to a file system directory folder from each file system driver object, and determining differences among each result, to determine information relating to a file system directory folder that is removed by at least one file system driver object.

18 Claims, 5 Drawing Sheets

METHOD AND SYSTEM FOR THE DETECTION OF FILE SYSTEM FILTER DRIVER BASED ROOTKITS

BACKGROUND OF THE INVENTION

1. Field of the Invention

The present invention relates to detecting hidden files and folders that may be installed by or as part of a rootkit.

2. Description of the Related Art

A file system filter driver is an optional driver that adds value to or modifies the behavior of another driver—specifically, a file system. It is a kernel-mode component that runs as part of an operating system, such as the Microsoft® Windows NT® executive.

A file system filter driver can filter I/O operations for one or more file systems or file system volumes. Depending on the nature of the driver, the filter can log, observe, or modify file system events, or the filter can even prevent file system events from occurring. Typical applications for file system filter drivers include antivirus utilities, encryption programs, and hierarchical storage management systems.

A file system filter driver works in conjunction with one or more file systems to manage file I/O operations. These operations include creating, opening, closing, and enumerating files and directories; getting and setting file, directory, and volume information; and reading and writing and file data. In addition, file system filter drivers must support file system-specific features such as caching, locking, sparse files, disk quotas, compression, security, recoverability, reparse points, and volume mount points.

A file system filter driver attaches itself to one or more mounted volumes and filters all I/O operations on the volume.

A rootkit is a set of software tools intended to conceal running processes, files or system data, thereby helping an intruder to maintain access to a system whilst avoiding detection. Rootkits are known to exist for a variety of operating systems such as Linux, Solaris and versions of Microsoft Windows. Rootkits often modify parts of the operating system or install themselves as drivers or kernel modules. The file system is of special interest to rootkits for stealth reasons. Many rootkits need to store files in the file system, and these must remain hidden. Therefore some rootkits install a file system filter driver to hide their files and their folders from other entities in the system.

For example, Greg Hoglund and James Butler have presented a file system filter driver rootkit that filters the IRP_MJ_DIRECTORY_CONTROL and IRP_MN_QUERY_DIRECTORY requests sent to the file system volume devices. These filter drivers create filter device objects and attach them to the base file system volume device objects. In its I/O completion routine, the rootkit filter driver modifies the returned buffer to remove any reference to any folder or file that the rootkit hides.

The current known approaches to detect hidden files and folders are based on parsing the on disk file structure to detect hidden files and folders. For example, the MICROSOFT® WINDOWS® NTFS® on disk metadata may be parsed to enumerate folders and files within those folders and then a similar query may be sent to the Windows I/O manager. The difference is taken between both results to detect hidden files and hidden folders.

Although such methods are very efficient and can reveal any hidden files and hidden folders that are made hidden from the Windows NT I/O manager, they suffer from a number of limitations or drawbacks. For example, such techniques do not identify the method that is used to hide files and folders. These methods vary from hooking the NT SSDT, or through using a file system filter driver. Therefore, they would detect hidden objects but will not provide enough information to remove the rootkit code from memory. Further, the NTFS on disk structure is not officially documented by Microsoft. All the available information is based on reverse engineering. Therefore the file system structure parsing code can get broken anytime Microsoft changes the NTFS on disk structure. So portability is a major issue facing those techniques. Finally, reading the NTFS on disk structure is suitable for offline forensic analyses purposes more than for real-time detection of hidden files and folders. This is because during the time the NTFS on disk structure is read by the rootkit detection code the NTFS driver may have kept some changes in its runtime memory cache to be flushed later on to the disk. Therefore, there is always a chance for an error between the actually reality and what the rootkit detection code can see.

Thus, a need arises for a technique by which hidden files and folders that may be installed by or as part of a rootkit may be detected that identifies the method that is used to hide the files and folders, that will continue working even if the operating system is modified, and that is suitable for real-time detection of hidden files and folders.

SUMMARY OF THE INVENTION

A method, system, and computer program product for detecting hidden files and folders that may be installed by or as part of a rootkit provides the capability to identify the method that is used to hide the files and folders, will continue working even if the operating system is modified, and is suitable for real-time detection of hidden files and folders.

A method for detecting a rootkit comprises the steps of generating a plurality of query input/output request packets, each query input/output request packet requesting information relating to a file system directory folder, transmitting a generated query input/output request packet to each file system driver object, receiving a result including the requested information relating to a file system directory folder from each file system driver object, and determining differences among each result, to determine information relating to a file system directory folder that is removed by at least one file system driver object.

In one aspect, of the method, each file system driver object may comprise one of a base file system driver object, a file system filter driver object, a rootkit file system filter driver object, or an input/output manager. The result including the requested information may include a listing of files and folders that are present in the file system directory folder. The differences may be determined by determining at least one file or folder that is present in a result including a listing of listing of files and folders received from at least one file system driver object is not present in a result including a listing of listing of files and folders received from at least one other file system driver object.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

A file system filter driver is an optional driver that adds value to or modifies the behavior of another driver—specifically, a file system. It is a kernel-mode component that runs as part of an operating system, such as the Microsoft® Windows NT® executive.

A file system filter driver can filter I/O operations for one or more file systems or file system volumes. Depending on the nature of the driver, the filter can log, observe, or modify file system events, or the filter can even prevent file system events from occurring. Typical applications for file system filter drivers include antivirus utilities, encryption programs, and hierarchical storage management systems.

A file system filter driver works in conjunction with one or more file systems to manage file I/O operations. These operations include creating, opening, closing, and enumerating files and directories; getting and setting file, directory, and volume information; and reading and writing and file data. In addition, file system filter drivers must support file system-specific features such as caching, locking, sparse files, disk quotas, compression, security, recoverability, reparse points, and volume mount points.

A file system filter driver attaches itself to one or more mounted volumes and filters all I/O operations on the volume.

File System Stacks

File system drivers create two different types of device objects: control device objects (CDO) and volume device objects (VDO). A file system stack consists of one of these device objects, together with any filter device objects for file system filter drivers that are attached to it. The file system's device object always forms the bottom of the stack.

File System Control Device Objects—File system control device objects represent entire file systems, rather than individual volumes, and are stored in the global file system queue. A file system creates one or more named control device objects in its DriverEntry routine. For example, FastFat creates two CDOs: one for fixed media and one for removable media. CDFS creates only one CDO, because it has only removable media.

File System Volume Device Objects—File system volume device objects represent volumes mounted by file systems. A file system creates a volume device object when it mounts a volume, usually in response to a volume mount request. Unlike a control device object, a volume device object is always associated with a specific logical or physical storage device.

Filter Device Object Attached to a File System—To filter an entire file system, a file system filter driver creates a filter device object and attaches it above a file system driver's CDO in the global file system queue.

Figure 1:
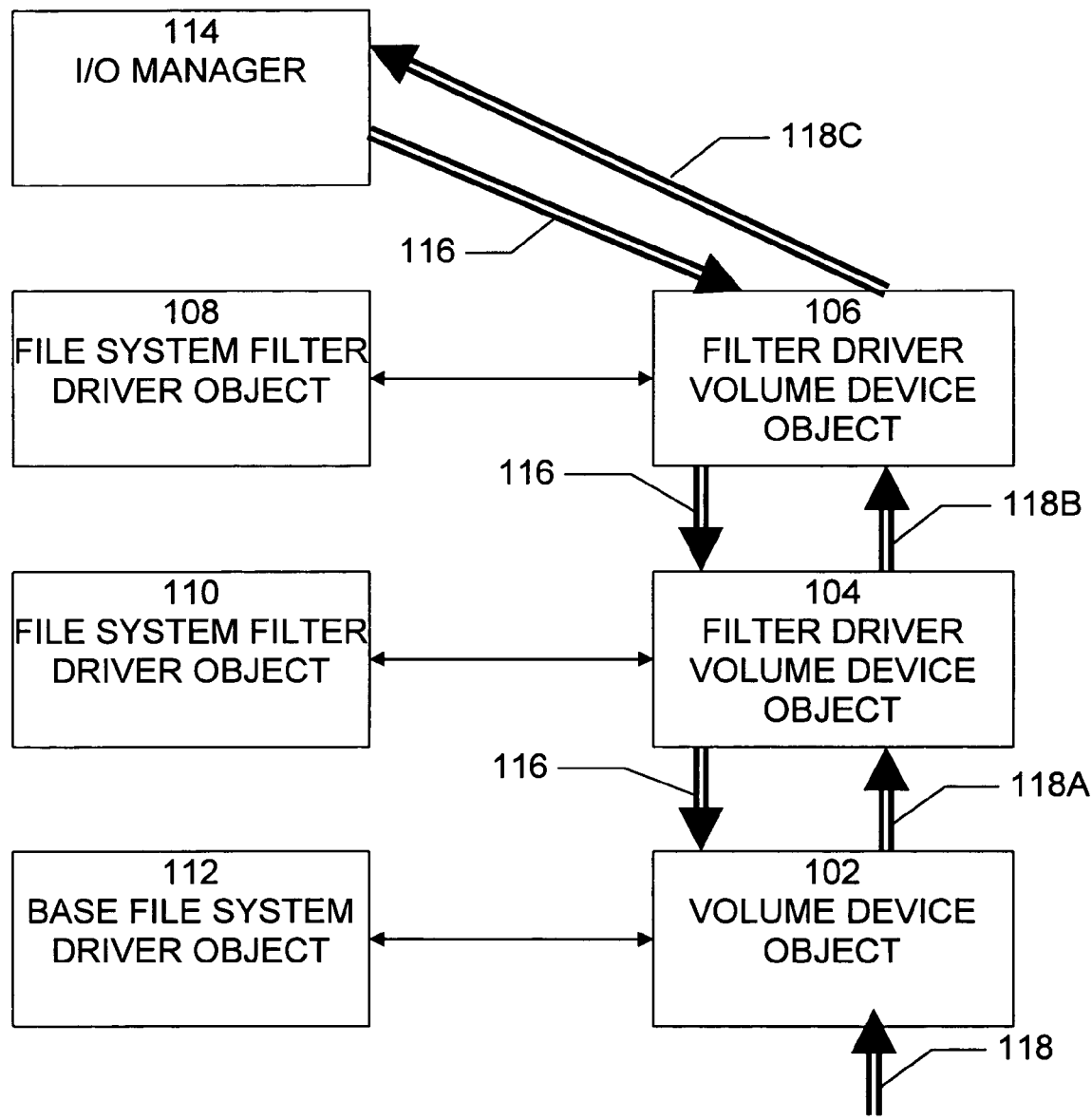
FIG. 1 is an exemplary block diagram of a file system, in which the present invention may be implemented.

An example of such a file system 100 is shown in FIG. 1. File system 100 includes volume device object 102 and attached filter driver volume device objects 104 and 106. The filtering is actually performed by filter driver objects, such as file system filter driver objects 108 and 110 and based file system driver object 112. To filter a volume, a filter driver, such as file system filter driver object 108 creates a filter device object, such as filter driver volume device object 106, and attaches it above the volume device object 102 for the volume.

A filter device object, such as objects 104 and 106, that is attached above a file system can generally expect to receive the following types of I/O requests:

IRP_MJ_DEVICE_CONTROL
IRP_MJ_FILE_SYSTEM_CONTROL
IRP_MJ_SHUTDOWN

A filter device object that is attached above a volume will receive all the different types of I/O requests sent to the volume device object, which includes all the different I/O requests defined by the I/O manager 114. The I/O manager 114 is used by applications and system services to access the file system. I/O requests are transmitted in the form of I/O Request Packets (IRPs), such as IRP 116. Typically, an IRP 116 is transmitted from I/O manager 112 to a filter device object, such as filter driver volume device object 106, which passes the IRP 116 to other filter device objects, such as filter driver volume device object 104, and ultimately to volume device object 102. The response to the IRP 116 is passed from volume device object 102 back to filter driver volume device object 104, filter driver volume device object 106, and to I/O manager 114. At any given filter device object, the filter driver object may filter (examine and/or modify) the response to the IRP, and the modified response is the response that is passed to other filter device objects and I/O manager 114. For example, as shown in FIG. 1, the response 118 may be received by volume device object 102, filtered by base file system driver object 112, the filtered response 118A passed to filter driver volume device object 104, filtered by file system filter driver object 110, the filtered response 118B passed to filter driver volume device object 106, filtered by file system filter driver object 108, and the filtered response 118C passed to I/O manager 114. Thus, the response may be examined and modified repeatedly before being passed to I/O manager 114.

Figure 2:
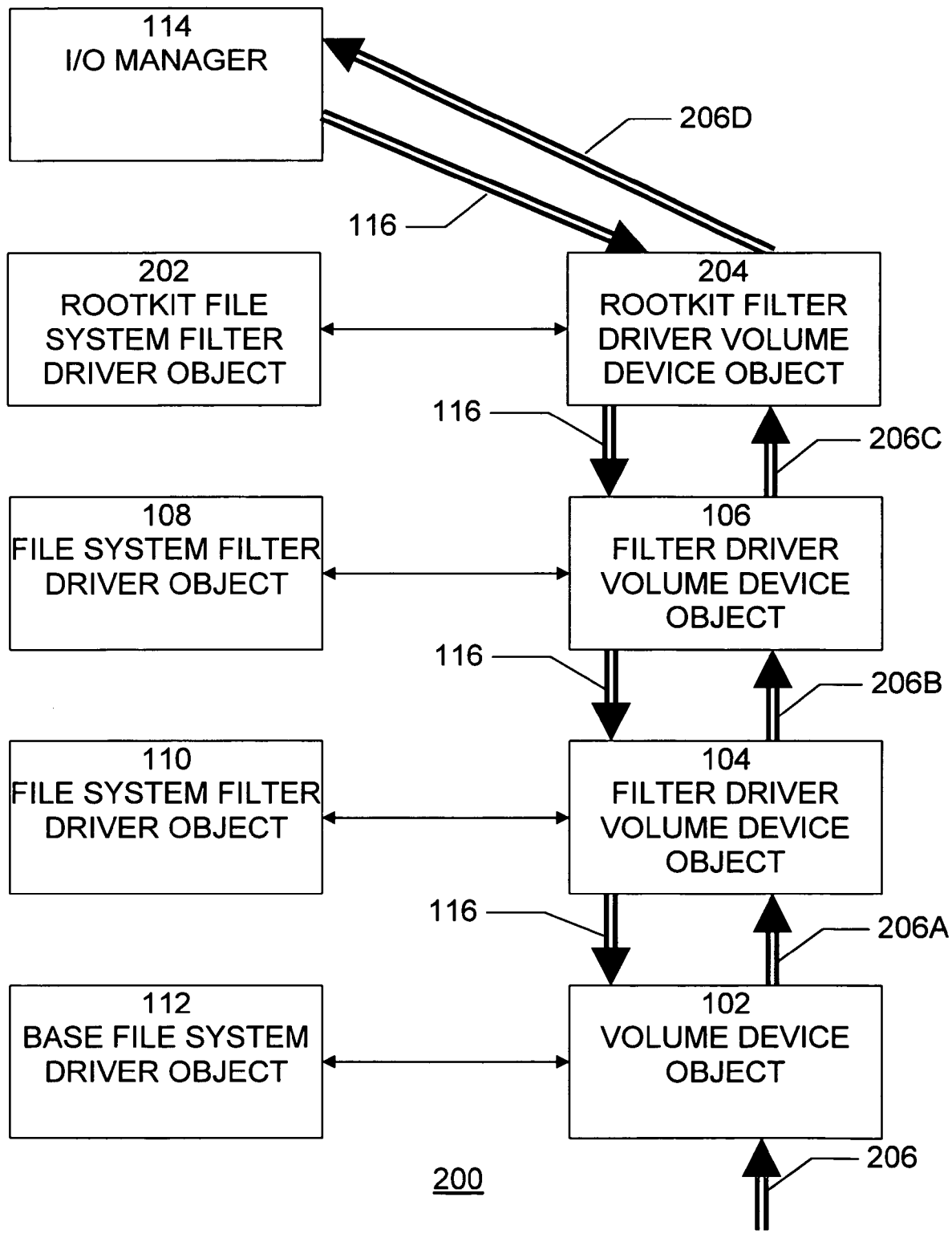
FIG. 2 is an exemplary block diagram of a file system including a rootkit that has attached a file system filter driver, in which the present invention may be implemented.

An example of such a file system 200 in which a rootkit has attached a file system filter driver is shown in FIG. 2. File system 200 includes volume device object 102 and attached filter driver volume device objects 104 and 106, as well as base file system driver object 112, and file system filter driver objects 110. A rootkit has attached a file system filter driver, in the form of rootkit file system filter driver object 202 and rootkit filter driver volume device object 204. This enables the rootkit file system driver to filter the response 206C and pass the filtered response 206D to I/O manager 114. The rootkit may do this, for example, to remove information relating to files that the rootkit wishes to keep hidden from the user and applications.

Although in FIGS. 1 and 2, examples of particular file system objects are shown in a particular arrangement, and in FIG. 2, examples of particular rootkit objects are shown in a particular arrangement, the present invention is not limited to the particular objects and arrangements shown. Rather, the present invention contemplates operation with any file system objects and rootkit objects, as well as any arrangement of the file system objects and rootkit objects.

Figure 3:
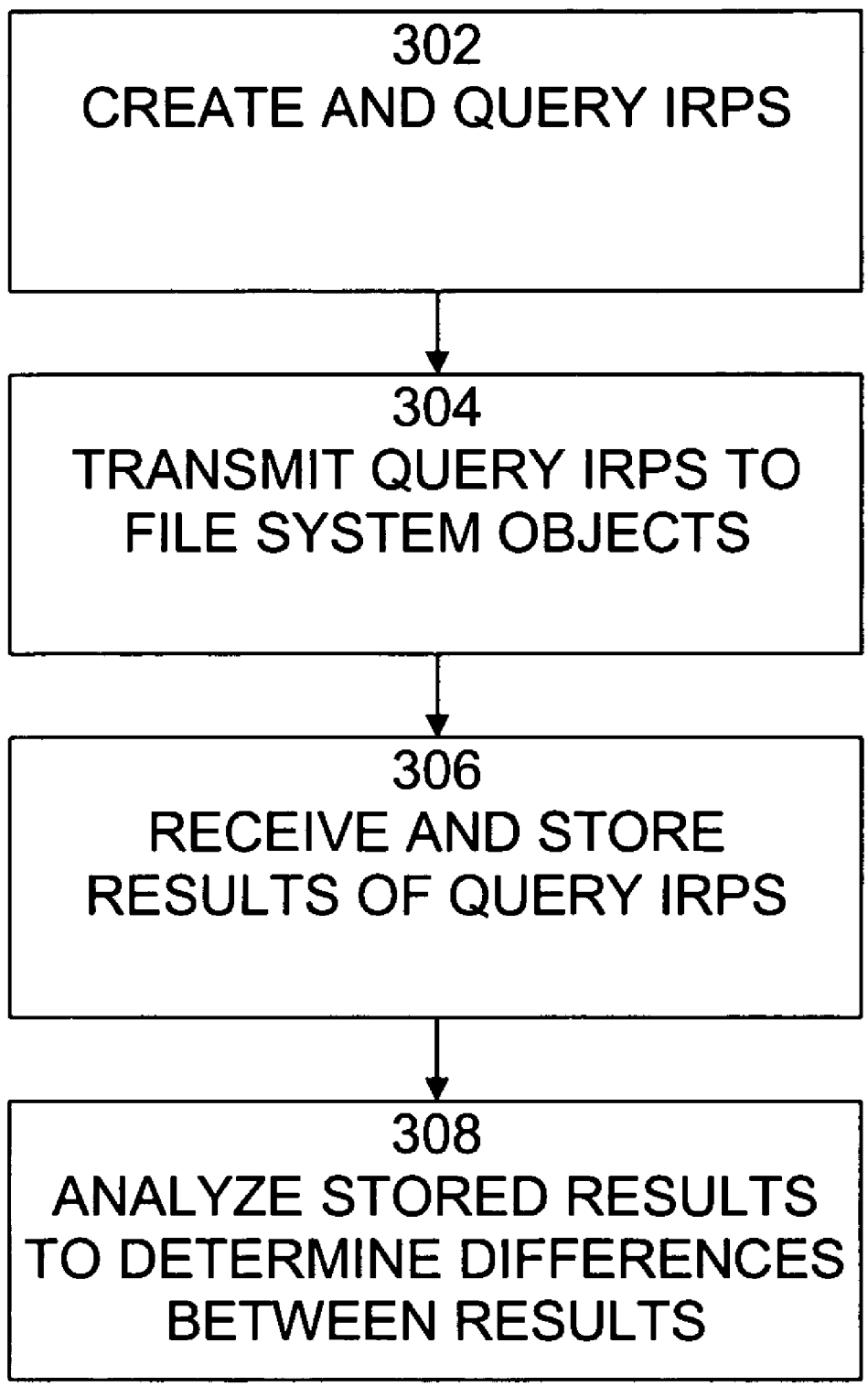
FIG. 3 is an exemplary flow diagram of a process of operation of the present invention.
Figure 4:
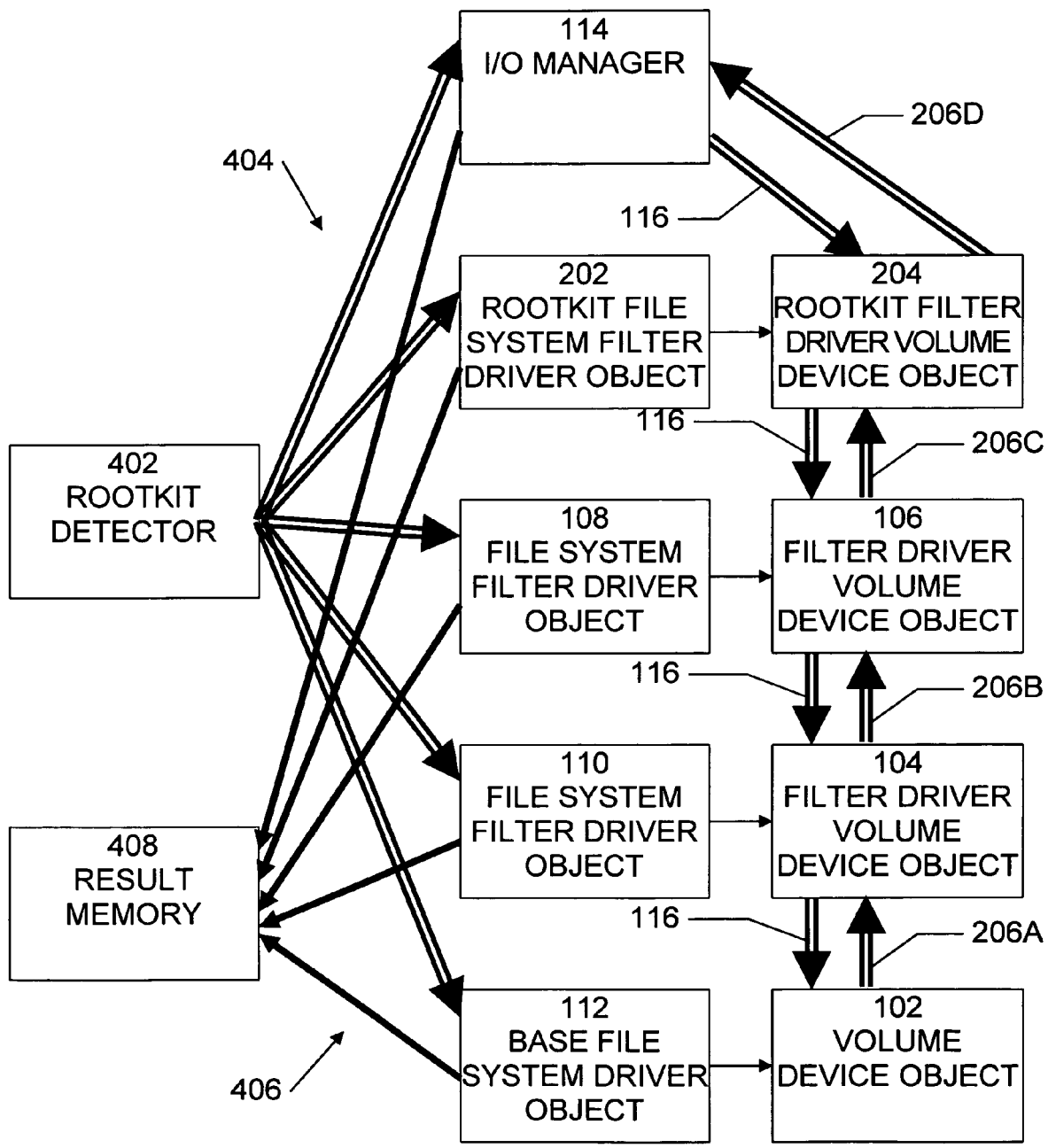
FIG. 4 is an data flow diagram of the operation of the process shown in FIG. 3.

An example of a process 300 of operation of the present invention is shown in FIG. 3, which is best viewed in conjunction with FIG. 4, which is a data flow diagram of the operation of the process shown in FIG. 3. Process 300 begins with step 302, in which identical IO request packets (IRPs) that query the folders and files in a specific file system directory folder are created. A rootkit detector 402 application or process generates a plurality of query IRPs 404. In step 304, each query IRP is sent directly to the base file system driver object 112 dispatch routines and to the dispatch routines of every file system filter driver object layered on top of the base file system volume device object. As shown in FIG. 4, this includes file system filter driver objects 108 and 110, I/O manager 114 and rootkit file system filter driver object 202. Upon the completion of each query IRP 404, the returned results 406 are kept in a separate memory 408 for further analysis. The difference between those results is generated and examined, which reveals the filter driver that hides any file(s) or folder(s). For example, the differences may be determined by determining at least one file or folder that is present in a result including a listing of listing of files and folders received from at least one file system driver object is not present in a result including a listing of listing of files and folders received from at least one other file system driver object.

Figure 5:
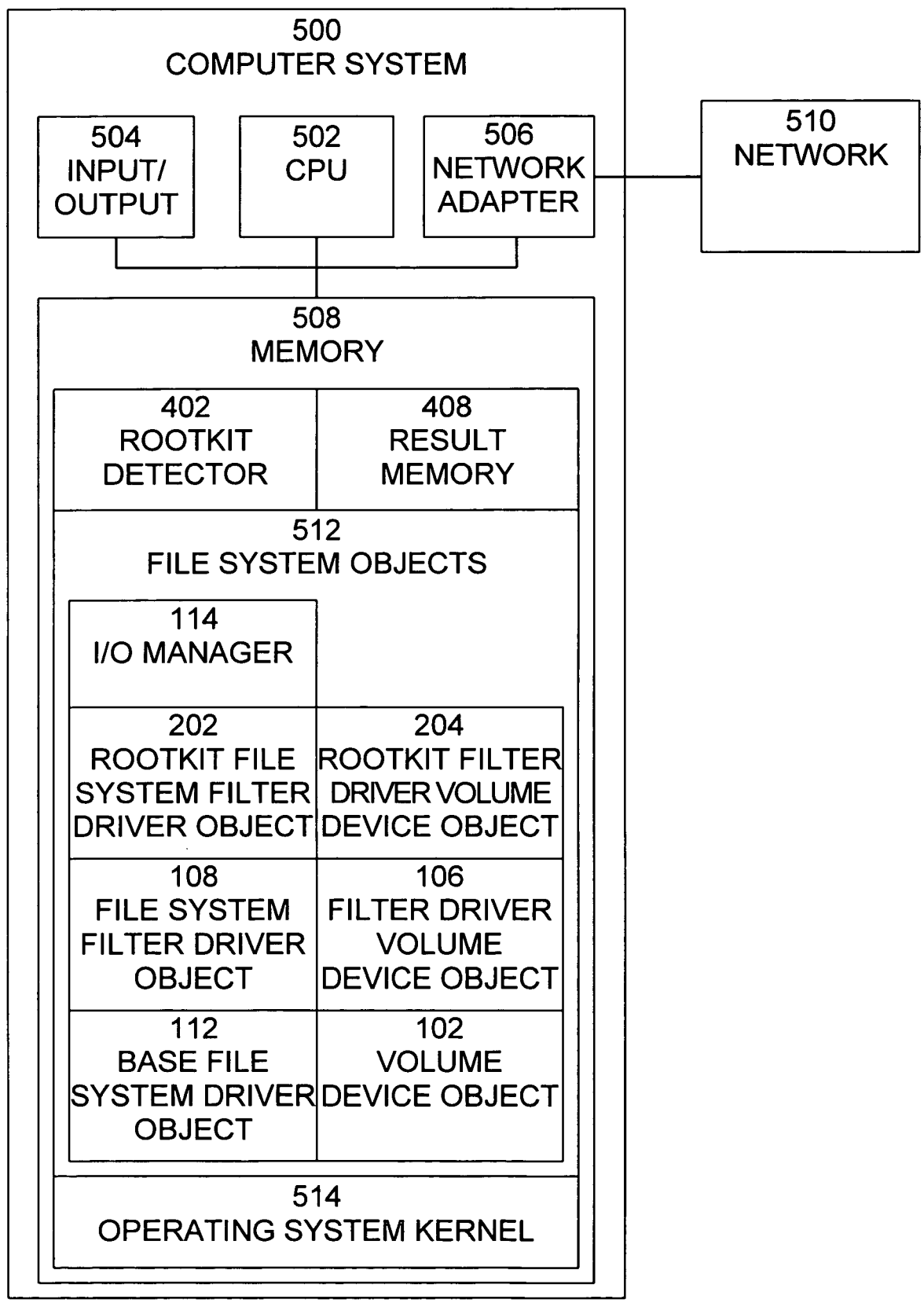
FIG. 5 is an exemplary block diagram of a computer system, in which the present invention may be implemented

A block diagram of an exemplary computer system 500, in which the present invention may be implemented, is shown in FIG. 5. Computer system 500 is typically a programmed general-purpose computer system, such as a personal computer, workstation, server system, and minicomputer or mainframe computer. Computer system 500 includes processor (CPU) 502, input/output circuitry 504, network adapter 506, and memory 508. CPU 502 executes program instructions in order to carry out the functions of the present invention. Typically, CPU 502 is a microprocessor, such as an INTEL PENTIUM® processor, but may also be a minicomputer or mainframe computer processor. Although in the example shown in FIG. 5, computer system 500 is a single processor computer system, the present invention contemplates implementation on a system or systems that provide multi-processor, multi-tasking, multi-process, multi-thread computing, distributed computing, and/or networked computing, as well as implementation on systems that provide only single processor, single thread computing. Likewise, the present invention also contemplates embodiments that utilize a distributed implementation, in which computer system 500 is implemented on a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces computer system 500 with network 510. Network 510 may be any standard local area network (LAN) or wide area network (WAN), such as Ethernet, Token Ring, the Internet, or a private or proprietary LAN/WAN.

Memory 508 stores program instructions that are executed by, and data that are used and processed by, CPU 502 to perform the functions of the present invention. Memory 508 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 508 includes rootkit detector 402, result memory 408, file system objects 512, and operating system kernel 514. Rootkit detector 402 generates query IRPs that query the folders and files in a specific folder, send them to file system objects 512, receive results of the queries, store the results in result memory 408, and analyze the difference between the results, which reveals the filter driver that hides any file(s) or folder(s). Result memory 408 stores the results of the query IRPs for analysis by rootkit detector 402. File system objects 512 include includes volume device object 102 and attached filter driver volume device objects 104 and 106, as well as base file system driver object 112, and file system filter driver objects 110. File system objects 512 also include any rootkit file system filter driver object 202 and rootkit filter driver volume device object 204 that may be present in computer system 500. Operating system kernel 512 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for detecting a rootkit, comprising the steps of:
   generating a plurality of query input/output request packets, each query input/output request packet requesting information relating to a file system directory folder;
   transmitting a generated query input/output request packet to each file system driver object;
   receiving a result including the requested information relating to a file system directory folder from each file system driver object; and
   determining differences among each result, to determine information relating to a file system directory folder that is removed by at least one file system driver object.

2. The method of claim 1, wherein each file system driver object comprises one of a base file system driver object, a file system filter driver object, a rootkit file system filter driver object, or an input/output manager.

3. The method of claim 1, wherein the result including the requested information includes a listing of files and folders that are present in the file system directory folder.

4. The method of claim 1, wherein the differences are determined by determining at least one file or folder that is present in a result including a listing of files and folders received from at least one file system driver object is not present in a result including a listing of files and folders received from at least one other file system driver object.

5. The method of claim 4, wherein each file system driver object comprises one of a base file system driver object, a file system filter driver object, a rootkit file system filter driver object, or an input/output manager.

6. A system for detecting a rootkit comprising:
a processor operable to execute computer program instructions;
a memory operable to store computer program instructions executable by the processor; and
computer program instructions stored in the memory and executable to perform the steps of:
generating a plurality of query input/output request packets, each query input/output request packet requesting information relating to a file system directory folder;
transmitting a generated query input/output request packet to each file system driver object;
receiving a result including the requested information relating to a file system directory folder from each file system driver object; and
determining differences among each result, to determine information relating to a file system directory folder that is removed by at least one file system driver object.

7. The system of claim 6, wherein each file system driver object comprises one of a base file system driver object, a file system filter driver object, a rootkit file system filter driver object, or an input/output manager.

8. The system of claim 6, wherein the result including the requested information includes a listing of files and folders that are present in the file system directory folder.

9. The system of claim 6, wherein the differences are determined by determining at least one file or folder that is present in a result including a listing of files and folders received from at least one file system driver object is not present in a result including listing of files and folders received from at least one other file system driver object.

10. The system of claim 9, wherein each file system driver object comprises one of a base file system driver object, a file system filter driver object, a rootkit file system filter driver object, or an input/output manager.

11. A computer program product for detecting a rootkit comprising:
a computer readable storage medium;
computer program instructions, recorded on the computer readable storage medium, executable by a processor, for performing the steps of
generating a plurality of query input/output request packets, each query input/output request packet requesting information relating to a file system directory folder;
transmitting a generated query input/output request packet to each file system driver object,
receiving a result including the requested information relating to a file system directory folder from each file system driver object; and
determining differences among each result, to determine information relating to a file system directory folder that is removed by at least one file system driver object.

12. The method of claim 11, wherein each file system driver object comprises one of a base file system driver object, a file system filter driver object, a rootkit file system filter driver object, or an input/output manager.

13. The method of claim 11, wherein the result including the requested information includes a listing of files and folders that are present in the file system directory folder.

14. The method of claim 11, wherein the differences are determined by determining at least one file or folder that is present in a result including a listing of files and folders received from at least one file system driver object is not present in a result including a listing of files and folders received from at least one other file system driver object.

15. The method of claim 14, wherein each file system driver object comprises one of a base file system driver object, a file system filter driver object, a rootkit file system filter driver object, or an input/output manager.

16. The method of claim 1, wherein each generated query input/output request packet is sent directly to a dispatch routine of each file system driver object.

17. The method of claim 1, wherein the result from each file system driver object is stored in a separate result memory.

18. The method of claim 1, wherein each generated query input/output request packet is sent directly to base file system driver object dispatch routines and to dispatch routines of every file system driver object layered on top of a base file system volume device object.

* * * * *

UNITED STATES PATENT AND TRADEMARK OFFICE
CERTIFICATE OF CORRECTION

PATENT NO. : 7,647,308 B2
APPLICATION NO. : 11/594096
DATED : January 12, 2010
INVENTOR(S) : Ahmed Sallam Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 288 days.

Signed and Sealed this

Twenty-eighth Day of December, 2010

David J. Kappos
*Director of the United States Patent and Trademark Office*